UNITED STATES PATENT OFFICE.

JOHN F. HOFFMAN, OF CINCINNATI, OHIO.

PAINT.

SPECIFICATION forming part of Letters Patent No. 237,017, dated January 25, 1881.

Application filed May 8, 1880. (Specimens.)

*To all whom it may concern:*

Be it known that I, JOHN F. HOFFMAN, of Cincinnati, in the county of Hamilton and State of Ohio, have invented a new and Improved Paint, of which the following is a specification.

The object of this invention is to provide a cheap and durable paint especially designed for application to tinned roofs, and to wooden and iron structures that are exposed to the weather.

This invention consists of a compound prepared by adding one bushel of quicklime to forty, or thereabout, gallons of what is known as the "light dead-oil," obtained by distillation from coal-tar, which mixture is allowed to stand until settled. Then to ten parts, by weight, of this oil so treated add five (5) parts pale rosin, or thereabout, three (3) parts of genuine asphaltum, or thereabout, and dissolve and mix by heat. These proportions, or nearly so, to be preserved for any amount desired.

The advantages of this paint are that it is a most excellent preservative of wood, and is applicable to iron and tin surfaces as well as to wood, adhering to new bright tin as few or no other paints will, especially those of which linseed-oil is a component part, and that it is cheap and durable, and also an excellent medium for applying mineral or other pigments of any color.

Having thus described my invention, I claim as new, and desire to secure by Letters Patent—

As a new article of manufacture, a paint, composed substantially as herein described, consisting of the following ingredients in substantially the specified proportions, by weight— namely: ten (10) parts of light dead-oil of coal-tar obtained by distillation and treated with quicklime, five (5) parts of pale rosin, and three (3) parts of asphaltum, dissolved by heat and mixed together, as set forth.

JOHN F. HOFFMAN.

Witnesses:
LEWIS H. PIERSON,
HENRY C. BRADLEY.